United States Patent
Hsu et al.

(10) Patent No.: US 11,319,434 B2
(45) Date of Patent: May 3, 2022

(54) BLOCK COPOLYMER, PREPARATION METHOD THEREOF, AND THIN FILM STRUCTURE COMPRISING THE SAME

(71) Applicant: INDUSTRIAL TECHNOLOGY RESEARCH INSTITUTE, Hsinchu (TW)

(72) Inventors: Meei-Yu Hsu, Hsinchu (TW); Yi-Chun Chen, Hsinchu (TW); Kai-Chi Chen, Tsautuen Jen (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 74 days.

(21) Appl. No.: 16/731,764

(22) Filed: Dec. 31, 2019

(65) Prior Publication Data

US 2021/0198474 A1    Jul. 1, 2021

(51) Int. Cl.

| | | |
|---|---|---|
| *C08F 220/18* | (2006.01) | |
| *C08F 220/44* | (2006.01) | |
| *C08F 214/22* | (2006.01) | |
| *C08F 220/38* | (2006.01) | |
| *C08L 53/00* | (2006.01) | |
| *C08K 5/375* | (2006.01) | |
| *C08K 5/3415* | (2006.01) | |
| *C08K 5/14* | (2006.01) | |

(52) U.S. Cl.
CPC ............ *C08L 53/00* (2013.01); *C08F 214/22* (2013.01); *C08F 220/1803* (2020.02); *C08F 220/387* (2020.02); *C08F 220/44* (2013.01); *C08K 5/14* (2013.01); *C08K 5/3415* (2013.01); *C08K 5/375* (2013.01); *C08F 2810/40* (2013.01); *C08L 2203/16* (2013.01)

(58) Field of Classification Search
CPC .......... C08L 81/06; C08L 29/04; C08L 53/00; C08L 2203/16; C02F 1/68; C08F 220/1803; C08F 2810/40; C08F 214/22; C08F 220/387; C08F 220/44; C08K 5/375; C08K 5/3415; C08K 5/14
See application file for complete search history.

(56) References Cited

U.S. PATENT DOCUMENTS

| | | |
|---|---|---|
| 4,855,163 A | 8/1989 | Joffee et al. |
| 9,707,524 B2 | 7/2017 | Kosar et al. |
| 2007/0219322 A1 | 9/2007 | Mayes et al. |

FOREIGN PATENT DOCUMENTS

| | | |
|---|---|---|
| CN | 102196849 B | 12/2014 |
| CN | 103204977 B | 10/2015 |
| CN | 105542607 A | 5/2016 |
| CN | 105705536 A | 6/2016 |
| CN | 104437124 B | 9/2017 |
| CN | 108884201 A | 11/2018 |
| TW | I552161 B | 2/2016 |
| WO | WO 2016/109621 A1 | 7/2016 |

OTHER PUBLICATIONS

Doncom et al., The direct synthesis of sulfobetaine-containing amphiphilic block copolymer and their self-assembly behavior, European Polymer Journal 87 (2017) 497-507 (Year: 2017).*
Taiwanese Office Action and Search Report for Taiwanese Application No. 108148597, dated Mar. 31, 2021.
Bütün, "Selective Betainization of 2-(dimethylamino)ethyl Methacrylate Residues in Tertiary Amine Methacrylate Diblock Copolymers and their Aqueous Solution Properties;" Polymer, vol. 44, 2003, pp. 7321-7334.
Doncom et al., "The Direct Synthesis of Sulfobetaine-containing Amphiphilic Black Copolymers and Their Self-assembly Behavior," European Polymer Journal, vol. 87, 2017 (Available online Sep. 4, 2016), pp. 497-507.
Lowe et al., "Synthesis and Characterization of Zwitterionic Block Copolymers," Macromolecules, vol. 31, No. 18, 1998, pp. 5991-5998.
Morishima et al., "Syntheses of Amphiphilic Block Copolymers. Block Copolymers of Methacrylic Acid and p-N,N-dimethylaminostyrene," Journal of Polymer Science: Polymer Chemistry Edition, vol. 20. 1982, pp. 299-310.

* cited by examiner

*Primary Examiner* — Robert D Harlan
(74) *Attorney, Agent, or Firm* — Birch, Stewart, Kolasch & Birch, LLP

(57) ABSTRACT

A block copolymer is provided. The block copolymer includes a first block including repeat units represented by formula (I), and a second block connected to the first block and including repeat units represented by formula (II) or (III). The disclosure also provides a method for preparing the block copolymer and a thin film structure including the same.

9 Claims, 1 Drawing Sheet

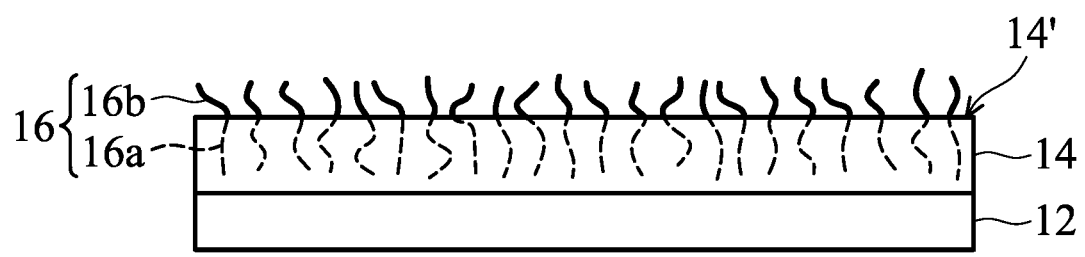

BLOCK COPOLYMER, PREPARATION METHOD THEREOF, AND THIN FILM STRUCTURE COMPRISING THE SAME

TECHNICAL FIELD

The present disclosure relates to a zwitterionic block copolymer, a preparation method thereof, and a thin film structure comprising the zwitterionic block copolymer.

BACKGROUND

At present, polyvinylidene fluoride (PVDF) films have faced challenges in practical application. Problems include its low permeability and the film pollution that is almost inevitable due to its hydrophobic nature. This is especially true when this film is used to treat wastewater containing natural organic matter. Protein contamination can cause a serious decrease in the flux of the film, and frequent cleaning is required to maintain the efficacy of the film.

In order to compensate for the unfavorable characteristics of polyvinylidene fluoride (PVDF) films, the industry has developed various modification technologies in an attempt to improve the hydrophilicity of films, and enhance the permeability and mechanical strength of films. For example, the surface of the film may be modified, and a hydrophilic layer may be deposited directly on the surface of the film or chemically bonded to the surface of the film. However, the above modification processes can easily cause the blockage of pores in the film.

SUMMARY

In order to improve the properties of polymer films, the present disclosure provides a novel zwitterionic block copolymer. The block copolymer is synthesized by adding an appropriate amount of zwitterionic monomers and hydrophobic monomers, and combining this with a manner of synthesis that includes a reversible addition-fragmentation chain transfer (RAFT) and a one-pot reaction. Next, the polymer film is prepared further by mixing the block copolymer to improve the wetting and antibacterial effects of the polymer film.

In accordance with one embodiment of the present disclosure, a block copolymer is provided. The block copolymer includes a first block including repeat units represented by formula (I); and a second block connected to the first block, wherein the second block includes repeat units represented by formula (II) or (III).

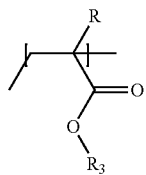

(I)

In formula (I), R includes hydrogen or methyl, and $R_3$ includes C1-5 alkyl.

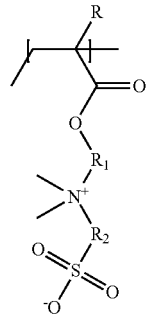

(II)

In formula (II), R includes hydrogen or methyl, and $R_1$ and $R_2$, independently, includes C1-8 alkyl.

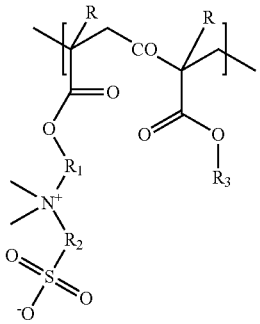

(III)

In formula (III), R includes hydrogen or methyl, $R_3$ includes C1-5 alkyl, and $R_1$ and $R_2$, independently, includes C1-8 alkyl.

In accordance with one embodiment of the present disclosure, a method for preparing a block copolymer is provided. The preparation method includes mixing a chain transfer reagent, a first free radical initiator, a zwitterionic monomer, and a first hydrophobic monomer to prepare a block copolymer precursor; and mixing a second free radical initiator, a second hydrophobic monomer, and the block copolymer precursor to prepare a block copolymer.

In accordance with one embodiment of the present disclosure, a thin film structure is provided. The thin film structure includes a polymer film; and the disclosed block copolymer embedded in the polymer film.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein:

FIG. 1 shows a cross-sectional view of a thin film structure including a zwitterionic block copolymer in accordance with one embodiment of the present disclosure.

DETAILED DESCRIPTION

The following description is made for the purpose of illustrating the general principles of the invention and should not be taken in a limiting sense. The scope of the invention is best determined by reference to the appended claims.

In accordance with one embodiment of the present disclosure, a block copolymer is provided. The block copolymer includes a first block including repeat units represented by formula (I); and a second block connected to the first block. The second block includes repeat units represented by formula (II) or (III).

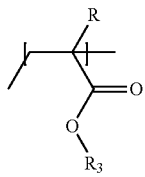
(I)

In formula (I), R includes hydrogen or methyl, and $R_3$ includes C1-5 alkyl.

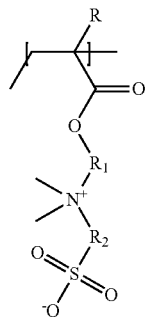
(II)

In formula (II), R includes hydrogen or methyl, and $R_1$ and $R_2$, independently, includes C1-8 alkyl.

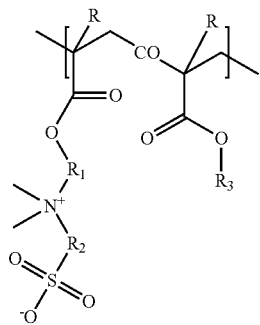
(III)

In formula (III), R includes hydrogen or methyl, $R_3$ includes C1-5 alkyl, and $R_1$ and $R_2$, independently, includes C1-8 alkyl.

In one embodiment, the first block has a molecular weight of about 3,000 to about 60,000. In one embodiment, the second block has a molecular weight of about 5,000 to about 60,000. In one embodiment, one end of the first block is connected to the second block, and the other end of the first block is connected to

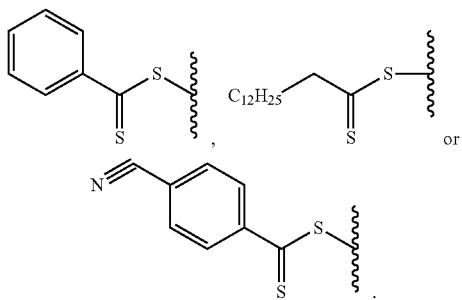

In one embodiment, one end of the second block is connected to the first block, and the other end of the second block is connected to

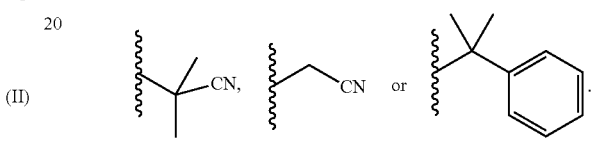

In one embodiment, the block copolymer of the present disclosure is represented by formula (IV).

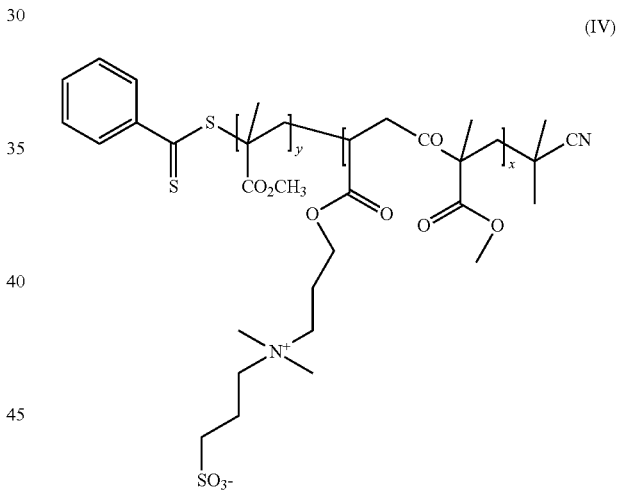
(IV)

In one embodiment, the block copolymer represented by formula (IV) has a molecular weight of about 8,000 to about 100,000.

In accordance with one embodiment of the present disclosure, a method for preparing a block copolymer is provided. The preparation method includes mixing a chain transfer reagent, a first free radical initiator, a zwitterionic monomer, and a first hydrophobic monomer to prepare a block copolymer precursor; and mixing a second free radical initiator, a second hydrophobic monomer, and the block copolymer precursor to prepare a block copolymer.

In one embodiment, the chain transfer reagent may include 2-cyano-2-propyl benzodithioate, 2-cyano-2-propyl 4-cyanobenzodithioate or 2-cyano-2-propyl dodecyl trithiocarbonate. In one embodiment, the first free radical initiator and the second free radical initiator may include azobisisobutyronitrile (AIBN), benzoyl peroxide (BPO) or 2,2'-azobis(2,4-dimethyl)valeronitrile (ABVN). In one embodiment, the zwitterionic monomer may include [3-(methacryloylamino)propyl]dimethyl(3-sulfopropyl) ammonium hydroxide inner salt or [2-(methacryloyloxy) ethyl]dimethyl-(3-sulfopropyl)ammonium hydroxide. In one embodiment, the first hydrophobic monomer and the second hydrophobic monomer may include methyl methacrylate (MMA), methyl acrylate (MA) or propyl methacrylate (PMA).

In one embodiment, the block copolymer precursor may include repeat units represented by formula (II) or (III).

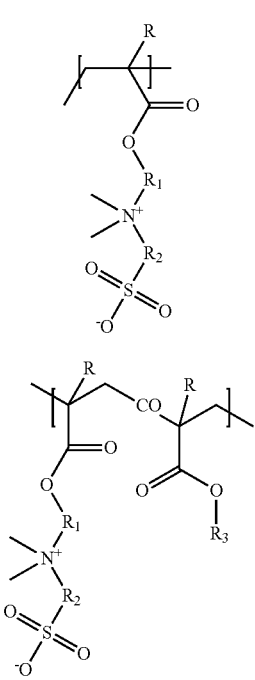

In formula (II), R includes hydrogen or methyl, and $R_1$ and $R_2$, independently, includes C1-8 alkyl.

In formula (III), R includes hydrogen or methyl, $R_3$ includes C1-5 alkyl, and $R_1$ and $R_2$, independently, includes C1-8 alkyl.

In one embodiment, the block copolymer may be prepared by a reversible addition-fragmentation chain transfer (RAFT) polymerization reaction. In one embodiment, the block copolymer may be prepared by a one-pot polymerization.

Referring to FIG. 1, in accordance with one embodiment of the present disclosure, a thin film structure 10 is provided. FIG. 1 shows a cross-sectional view of the thin film structure 10.

As shown in FIG. 1, the thin film structure 10 includes a support layer 12, a polymer film 14 and a block copolymer 16. The polymer film 14 is formed on the support layer 12. The block copolymer 16 is embedded in the polymer film 14.

In one embodiment, the support layer 12 may include a polyethylene terephthalate fiber (PET) plastic substrate, a polypropylene fiber (PP) plastic substrate, or a polyethylene fiber (PE) plastic substrate.

In one embodiment, the polymer film 14 may include polyvinylidene fluoride (PVDF), polysulfone (PS) polyether sulfone (PES), polyvinyl chloride (PVC) or polyacrylonitrile (PAN).

In one embodiment, the block copolymer 16 is embedded in the polymer film 14 in, for example, a self-assembling manner. In one embodiment, the first block 16a of the block copolymer 16 is embedded in the polymer film 14, and the second block 16b is exposed from the surface 14' of the polymer film 14. In one embodiment, the second block 16b has a coverage ratio over the surface 14' of the polymer film 14 of about 20% to about 60%.

In one embodiment, the block copolymer 16 includes a first block 16a including repeat units represented by formula (I); and a second block 16b connected to the first block 16a. The second block 16b includes repeat units represented by formula (II) or (III).

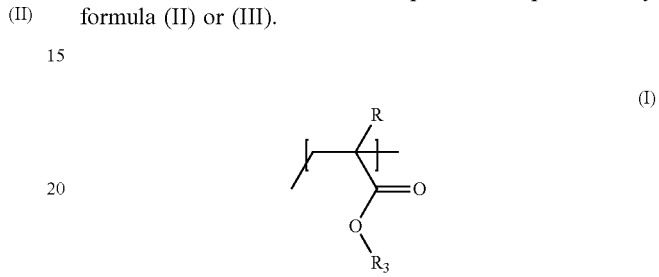

In formula (I), R includes hydrogen or methyl, and $R_3$ includes C1-5 alkyl.

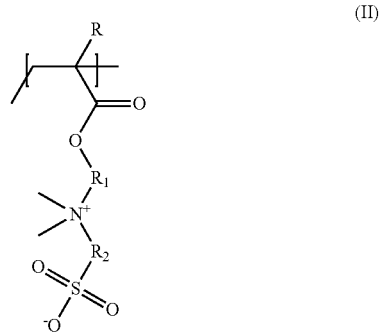

In formula (II), R includes hydrogen or methyl, and $R_1$ and $R_2$, independently, includes C1-8 alkyl.

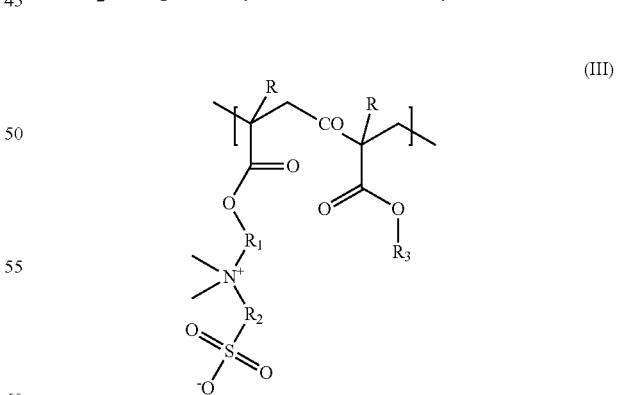

In formula (III), R includes hydrogen or methyl, $R_3$ includes C1-5 alkyl, and $R_1$ and $R_2$, independently, includes C1-8 alkyl.

In one embodiment, the first block 16a has a molecular weight of about 3,000 to about 60,000. In one embodiment, the second block 36b has a molecular weight of about 5,000 to about 60,000. In one embodiment, one end of the first block 16a is connected to the second block 16b, and the other end of the first block 16a is connected to

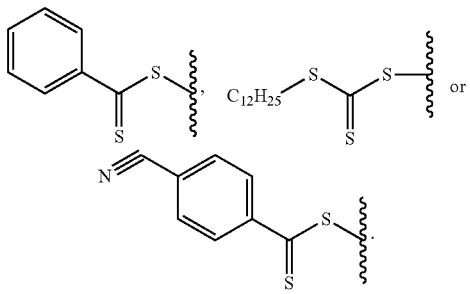

In one embodiment, one end of the second block 16b is connected to the first block 16a, and the other end of the second block 16b is connected to

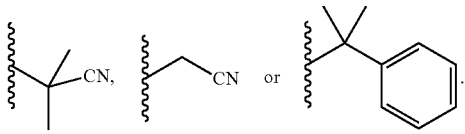

In one embodiment, the block copolymer 16 is represented by formula (IV).

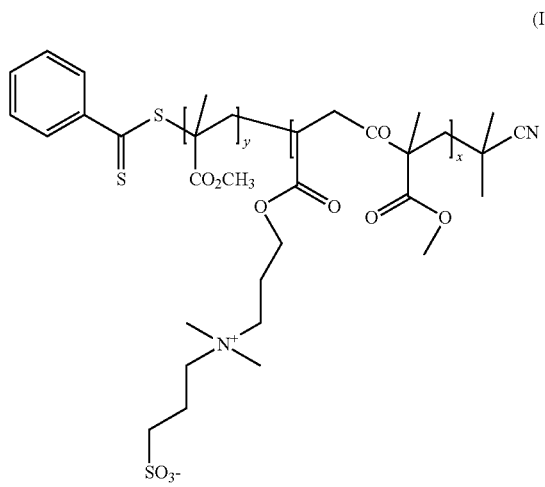

(IV)

In one embodiment, the block copolymer 16 represented by formula (IV) has a molecular weight of about 8,000 to about 100,000.

The zwitterionic block copolymer of the present disclosure can be applied as a blending material with thin films. In order to form a block copolymer of highly polar and water-soluble zwitterionic monomers and oil-soluble hydrophobic monomers, during the polymerization of the zwitterionic monomers, a small amount of the hydrophobic monomers needs to be added to adjust the solubility of the zwitterionic block. After that, the polymerization of the hydrophobic block can be carried out, and finally a block copolymer structure having a zwitterionic hydrophilic block and a hydrophobic block is formed. The present disclosure utilizes reversible addition-fragmentation chain transfer (RAFT) polymerization to synthesize block copolymers, which can effectively improve the conversion rate of the zwitterionic monomers. In addition, in the process of blending with a thin film, due to the self-assembly characteristics of the block copolymer itself, the hydrophobic block is embedded in the thin film, and the zwitterionic hydrophilic block is exposed from the surface of the thin film, thereby improving the hydrophilicity and stain resistance of the surface of the thin film.

EXAMPLES/COMPARATIVE EXAMPLES

Example 1

Preparation of the Block Copolymer (1)

Synthesis of the Zwitterion-Containing Block

First, 43.7 mg of 2-cyano-2-propyl benzodithioate (a chain transfer reagent), 8.9 mg of azobisisobutyronitrile (AIBN) (a free radical initiator), 0.975 g of [3-(Methacryloylamino)propyl] dimethyl(3-sulfopropyl)ammonium hydroxide inner salt (SPP) (a zwitterionic monomer), 1 g of methyl methacrylate (MMA) (a hydrophobic monomer), 20 g of methanol solvent and a magnet were placed in a 100-mL single-neck reaction flask. Next, deaeration was repeated three times in a freeze-pump-thaw mode to ensure that the subsequent polymerization was performed under anaerobic conditions. After removal of oxygen, the reaction was heated to 60° C. for 24 hours. After the reaction was complete, the reaction solution was subjected to NMR analysis. The NMR analysis results were as follows: $^1$H-NMR (400 MHz in $D_2O$): 0.2-1.5 (m, 5H-MMA, 9H-SPP), 2.7-3.5 (m, 14H-SPP), 3.5-3.8 (br.s, 3H-MAA), 5.38 (s, 1H, hydrogen on double bond of unreacted SPP), 5.6 (s, 1H, hydrogen on double bond of unreacted SPP). The conversion rate of SPP was 52%. The conversion rate of MMA was 19%. From the conversion rate, the molecular weight of the zwitterion-containing block was estimated as 3,528 (SPP:MMA=1:1.09). After recognizing the molecular weight of the zwitterion-containing block, a hydrophobic block was synthesized.

Synthesis of the Hydrophobic Block and the Block Copolymer 12 mg of azobisisobutyronitrile (AIBN) (a free radical initiator) and 2.96 g of methyl methacrylate (MMA) (a hydrophobic monomer) were added to the reaction solution. Next, deaeration was repeated three times in a freeze-pump-thaw mode to ensure that the subsequent polymerization was performed under anaerobic conditions. After removal of oxygen, the reaction was heated to 60° C. for 24 hours. After the reaction was complete, the reaction solution was slowly dropped into 100 mL of diethyl ether to settle the product. The product was filtered and dried to obtain 3.7 g of a block copolymer. The block copolymer was subjected to NMR analysis. The NMR analysis results were as follows: $^1$H-NMR (400 MHz in $D_2O$): 0.2-2.0 (m, 5H-MMA, 9H-SPP), 2.7-3.5 (m, 14H-SPP), 3.5-3.8 (br.s, 3H-MAA), 7.5-8.0 (m, 5H-raft, ArH). The molecular weight of the block copolymer was estimated as (SPP2.6 k-co-MMA1.8 k)-b-(SPP2.7 k-co-MMA10.9 k). The content of the zwitterionic monomer was 12.5 mol %.

Example 2

Preparation of the Block Copolymer (2)
Synthesis of the Zwitterion-Containing Block First, 43.7 mg of 2-cyano-2-propyl benzodithioate (a chain transfer reagent), 16.2 mg of azobisisobutyronitrile (AIBN) (a free radical initiator), 0.975 g of [3-(Methacryloylamino)propyl] dimethyl(3-sulfopropyl)ammonium hydroxide inner salt (SPP) (a zwitterionic monomer), 1 g of methyl methacrylate (MMA) (a hydrophobic monomer), 20 g of methanol solvent and a magnet were placed in a 100-mL single-neck reaction flask. Next, deaeration was repeated three times in a freeze-pump-thaw mode to ensure that the subsequent polymerization was performed under anaerobic conditions. After removal of oxygen, the reaction was heated to 60° C. for 24 hours. After the reaction was complete, the reaction solution was subjected to NMR analysis. The NMR analysis results were as follows: $^1$H-NMR (400 MHz in $D_2O$): 0.2-1.5 (m, 5H-MMA, 9H-SPP), 2.7-3.5 (m, 14H-SPP), 3.5-3.8 (br.s, 3H-MAA), 5.38 (s, 1H, hydrogen on double bond of unreacted SPP), 5.6 (s, 1H, hydrogen on double bond of unreacted SPP). The conversion rate of SPP was 59%. The conversion rate of MMA was 27%. From the conversion rate, the molecular weight of the zwitterion-containing block was estimated as 4,279 (SPP:MMA=1:1.39). After recognizing the molecular weight of the zwitterion-containing block, a hydrophobic block was synthesized.

Synthesis of the Hydrophobic Block and the Block Copolymer 16.2 mg of azobisisobutyronitrile (AIBN) (a free radical initiator) and 2.96 g of methyl methacrylate (MMA) (a hydrophobic monomer) were added to the reaction solution. Next, deaeration was repeated three times in a freeze-pump-thaw mode to ensure that the subsequent polymerization was performed under anaerobic conditions. After removal of oxygen, the reaction was heated to 60° C. for 24 hours. After the reaction was complete, the reaction solution was slowly dropped into 100 mL of diethyl ether to settle the product. The product was filtered and dried to obtain 4.1 g of a block copolymer. The block copolymer was subjected to NMR analysis. The NMR analysis results were as follows: $^1$H-NMR (400 MHz in $D_2O$): 0.2-2.0 (m, 5H-MMA, 9H-SPP), 2.7-3.5 (m, 14H-SPP), 3.5-3.8 (br.s, 3H-MAA), 7.5-8.0 (m, 5H-raft, ArH). The molecular weight of the block copolymer was estimated as (SPP2.9 k-co-MMA1.4 k)-b-(SPP1.2 k-co-MMA10.7 k). The content of the zwitterionic monomer was 10.3 mol %.

Example 3

Preparation of the Block Copolymer (3)
Synthesis of the Zwitterion-Containing Block First, 43.7 mg of 2-cyano-2-propyl benzodithioate (a chain transfer reagent), 16.2 mg of azobisisobutyronitrile (AIBN) (a free radical initiator), 1.95 g of [3-(Methacryloylamino)propyl] dimethyl(3-sulfopropyl)ammonium hydroxide inner salt (SPP) (a zwitterionic monomer), 2 g of methyl methacrylate (MMA) (a hydrophobic monomer), 20 g of methanol solvent and a magnet were placed in a 100-mL single-neck reaction flask. Next, deaeration was repeated three times in a freeze-pump-thaw mode to ensure that the subsequent polymerization was performed under anaerobic conditions. After removal of oxygen, the reaction was heated to 60° C. for 24 hours. After the reaction was complete, the reaction solution was subjected to NMR analysis. The NMR analysis results were as follows: $^1$H-NMR (400 MHz in $D_2O$): 0.2-1.5 (m, 5H-MMA, 9H-SPP), 2.7-3.5 (m, 14H-SPP), 3.5-3.8 (br.s, 3H-MAA), 5.38 (s, 1H, hydrogen on double bond of unreacted SPP), 5.6 (s, 1H, hydrogen on double bond of unreacted SPP). The conversion rate of SPP was 60%. From the conversion rate, the molecular weight of the zwitterion-containing block was estimated as 8,385 (SPP:MMA=1:1.22). After recognizing the molecular weight of the zwitterion-containing block, a hydrophobic block was synthesized.

Synthesis of the Hydrophobic Block and the Block Copolymer 16.2 mg of azobisisobutyronitrile (AIBN) (a free radical initiator) and 2.96 g of methyl methacrylate (MMA) (a hydrophobic monomer) were added to the reaction solution. Next, deaeration was repeated three times in a freeze-pump-thaw mode to ensure that the subsequent polymerization was performed under anaerobic conditions. After removal of oxygen, the reaction was heated to 60° C. for 24 hours. After the reaction was complete, the reaction solution was slowly dropped into 100 mL of diethyl ether to settle the product. The product was filtered and dried to obtain 6 g of a block copolymer. The block copolymer was subjected to NMR analysis. The NMR analysis results were as follows: $^1$H-NMR (400 MHz in $D_2O$): 0.2-2.0 (m, 5H-MMA, 9H-SPP), 2.7-3.5 (m, 14H-SPP), 3.5-3.8 (br.s, 3H-MAA), 7.5-8.0 (m, 5H-raft, ArH). The molecular weight of the block copolymer was estimated as (SPP5.9 k-co-MMA2.5 k)-b-(SPP4.6 k-co-MMA15.6 k). The content of the zwitterionic monomer was 16.3 mol %.

Example 4

Preparation of the Block Copolymer (4)
Synthesis of the Zwitterion-Containing Block First, 43.7 mg of 2-cyano-2-propyl benzodithioate (a chain transfer reagent), 16.2 mg of azobisisobutyronitrile (AIBN) (a free radical initiator), 2.93 g of [3-(Methacryloylamino)propyl] dimethyl(3-sulfopropyl)ammonium hydroxide inner salt (SPP) (a zwitterionic monomer), 3 g of methyl methacrylate (MMA) (a hydrophobic monomer), 15 g of methanol solvent and a magnet were placed in a 100-mL single-neck reaction flask. Next, deaeration was repeated three times in a freeze-pump-thaw mode to ensure that the subsequent polymerization was performed under anaerobic conditions. After removal of oxygen, the reaction was heated to 60° C. for 24 hours. After the reaction was complete, the reaction solution was subjected to NMR analysis. The NMR analysis results were as follows: $^1$H-NMR (400 MHz in $D_2O$): 0.2-1.5 (m, 5H-MMA, 9H-SPP), 2.7-3.5 (m, 14H-SPP), 3.5-3.8 (br.s, 3H-MAA), 5.38 (s, 1H, hydrogen on double bond of unreacted SPP), 5.6 (s, 1H, hydrogen on double bond of unreacted SPP). The conversion rate of SPP was 71.8%. The conversion rate of MMA was 14.9%. From the conversion rate, the molecular weight of the zwitterion-containing block was estimated as 10,770 (SPP:MMA=1:0.62). Next, 16.2 mg of azobisisobutyronitrile (AIBN) (a free radical initiator) was added to the reaction solution. Next, deaeration was repeated three times in a freeze-pump-thaw mode to ensure that the subsequent polymerization was performed under anaerobic conditions. After removal of oxygen, the reaction was heated to 60° C. for 24 hours. After the reaction was complete, the reaction solution was subjected to NMR analysis. The NMR analysis results were as follows: $^1$H-NMR (400 MHz in $D_2O$): 0.2-1.5 (m, 5H-MMA, 9H-SPP), 2.7-3.5 (m, 14H-SPP), 3.5-3.8 (br.s, 3H-MAA), 5.38 (s, 1H, hydrogen on double bond of unreacted SPP), 5.6 (s, 1H, hydrogen on double bond of unreacted SPP). The conversion rate of SPP was 90.2%. The conversion rate of MMA was 55.8%. From the conversion rate, after the second polymerization, the molecular weight of the zwitterion-containing block was estimated as 21,900 (SPP:MMA=1:1.99). After recognizing the molecular weight of the zwitterion-containing block, a hydrophobic block was synthesized.

Synthesis of the Hydrophobic Block and the Block Copolymer 16.2 mg of azobisisobutyronitrile (AIBN) (a free radical initiator) and 2.96 g of methyl methacrylate (MMA) (a hydrophobic monomer) were added to the reaction solution. Next, deaeration was repeated three times in a freeze-pump-thaw mode to ensure that the subsequent polymerization was performed under anaerobic conditions. After removal of oxygen, the reaction was heated to 60° C. for 24 hours. After the reaction was complete, the reaction solution was slowly dropped into 100 mL of diethyl ether to settle the product. The product was filtered and dried to obtain 9 g of a block copolymer. The block copolymer was subjected to NMR analysis. The NMR analysis results were as follows: $^1$H-NMR (400 MHz in $D_2O$): 0.2-1.5 (m, 3H-MMA, 3H-SPP), 1.5-2.5 (m, 2H-MMA, 6H-SPP), 2.7-3.5 (m, 14H-SPP), 3.5-3.8 (br.s, 3H-MAA), 5.4 (s, 1H, hydrogen on double bond of unreacted SPP), 5.7 (s, 1H, hydrogen on double bond of unreacted SPP). The conversion rate of SPP was 93.4%. From the conversion rate, the molecular weight of the zwitterion-containing block was estimated as (SPP10.8 k-co-MMA0.2 k)-b-(SPP2.7 k-co-MMA8.2 k)-b-(SPP0.4 k-co-MMA16.9 k). The content of the zwitterionic monomer was 15.8 mol %.

Example 5

Preparation of the Polymer Film (1)

A film solution was prepared as follows. 1.7 g of polyvinylidene fluoride (PVDF) (Mw: 500 k) and 0.3 g of the block copolymer, as a blended material, prepared by Example 1 were dissolved in 8 g of N-methyl pyrrolidinone (NMP) to prepare a 20 wt % solution. Next, the solution was evenly coated on the plastic substrate using a scraper. The polymer film of this example was then prepared using the nonsolvent-induce phase separation (NIPS) method.

Example 6

Preparation of the Polymer Film (2)

A film solution was prepared as follows. 1.7 g of polyvinylidene fluoride (PVDF) (Mw: 500 k) and 0.3 g of the block copolymer, as a blended material, prepared by Example 2 were dissolved in 8 g of N-methyl pyrrolidinone (NMP) to prepare a 20 wt % solution. Next, the solution was evenly coated on the plastic substrate using a scraper. The polymer film of this example was then prepared using the nonsolvent-induce phase separation (NIPS) method.

Example 7

Preparation of the Polymer Film (3)

A film solution was prepared as follows. 1.7 g of polyvinylidene fluoride (PVDF) (Mw: 500 k) and 0.3 g of the block copolymer, as a blended material, prepared by Example 3 were dissolved in 8 g of N-methyl pyrrolidinone (NMP) to prepare a 20 wt % solution. Next, the solution was evenly coated on the plastic substrate using a scraper. The polymer film of this example was then prepared using the nonsolvent-induce phase separation (NIPS) method.

Example 8

Preparation of the Polymer Film (4)

A film solution was prepared as follows. 1.7 g of polyvinylidene fluoride (PVDF) (Mw: 500 k) and 0.3 g of the block copolymer, as a blended material, prepared by Example 4 were dissolved in 8 g of N-methyl pyrrolidinone (NMP) to prepare a 20 wt % solution. Next, the solution was evenly coated on the plastic substrate using a scraper. The polymer film of this example was then prepared using the nonsolvent-induce phase separation (NIPS) method.

Comparative Example 1

Preparation of the Polymer Film

A film solution was prepared as follows. 2 g of polyvinylidene fluoride (PVDF) (Mw: 500 k) was dissolved in 10 g of N-methyl pyrrolidinone (NMP) to prepare a 20 wt % solution. Next, the solution was evenly coated on the plastic substrate using a scraper. The polymer film of this comparative example was then prepared using the nonsolvent-induce phase separation (NIPS) method.

Example 9

Coverage Rate of the Zwitterionic Block Over the Surface of the Polymer Films

The elemental analysis of the surface of the polymer films prepared in Examples 5-7 was performed using X-ray photoelectron spectroscopy (XPS). The absorption peak of quaternary amine was at 403 ev and it is the quaternary amine in the zwitterionic block. The carbon absorption of $CF_2$ was at 291 ev. From this, the coverage rate of the zwitterionic block over the surface of the polymer films prepared in Examples 5-7 can be calculated. The results are shown in Table 1 below.

TABLE 1

| | XPS (%) | | | | | |
|---|---|---|---|---|---|---|
| | C | O | F | S | N | Coverage rate |
| Com. Example 1 | 52 | 4 | 43 | | 1.7 (non-quaternary amine) | |
| Example 5 | 59 | 7 | 32 | 0.4 | 1 (quaternary amine) | 33% |
| Example 6 | 60 | 11 | 28 | 1 | 1 (quaternary amine) | 44% |
| Example 7 | 61 | 12 | 25 | 1 | 2 (quaternary amine) | 53% |

From the results in Table 1, no quaternary amine was detected on the surface of the original PVDF film prepared in Comparative Example 1. However, in the modified PVDF film prepared in Examples 5-7, the coverage rate of the zwitterionic block over the film surface reached 33-53%.

Example 10

Tests of Contact Angle and Wetting Effect of the Polymer Films

In this example, the initial contact angle of the surface of the polymer films prepared in Examples 5-7 was measured, and the change of the contact angle (that is, wetting and hydrophilic effect) was observed within 1 minute. The results are shown in Table 2.

TABLE 2

|  | Initial contact angle | Angle of drop after one minute (wetting and hydrophilic effect) |
|---|---|---|
| Com. Example 1 | 83.8 | 5.82 |
| Example 5 | 62.7 | 13.7 |
| Example 6 | 57.3 | 13.4 |
| Example 7 | 60.1 | 17.3 |

From the results in Table 2, the change of the surface contact angle of the original PVDF film prepared in Comparative Example 1 within 1 minute was only 5.82 degrees. However, the surface contact angle of the modified PVDF films prepared in Examples 5-7 changes to 13.4-17.3 degrees within 1 minute, which greatly improves the wetting and hydrophilic effect of the surface of the PVDF films.

Example 11

Antibacterial Tests of the Polymer Films

In this example, the antibacterial tests were performed according to the following procedure: (1) *Escherichia coli* (*E. coli*) was cultivated, (2) A 3 cm*7 cm film was cut (with alcohol disinfection), (3) Residual alcohol on the film was rinsed with sterile water, (4) the film was placed in a 15-mL centrifuge tube (the active layer was turned up), (5) 15 mL of bacterial solution was taken into the 15-mL centrifuge tube, and the inoculation quantity was about $3.1*10^{10}$ CFU/$m^2$, (6) the centrifuge tube was placed in a 37° C. incubator and an adhesion test was performed after 2 hours of incubation, (7) The film with microorganisms was placed in a 15-mL centrifuge tube, and 15 mL of PBS was added to the centrifuge tube with shaking at 200 rpm for 1 hour, (8) 1 mL of bacterial solution was spread on a LB medium using the spread-plate method, (9) The medium was placed in the 37° C. incubator and incubated for 24 hours, and (10) Colonies were counted. The test results are shown in Table 3.

TABLE 3

| Polymer films | Antibacterial material | *E. coli* colonies | Antibacterial effect |
|---|---|---|---|
| Com. Example 1 | Non | $2.1 * 10^4$ CFU/mL | No |
| Example 7 | Zwitterionic block containing quaternary amine | $4.2 * 10^3$ CFU/mL | 80.01% |

From the results in Table 3, since the surface of the modified PVDF film prepared in Example 7 was covered with the zwitterionic block containing quaternary amine, the number of colonies on the film surface was greatly reduced after cultivation for 24 hours, indicating that the modified polymer film of the present disclosure had improved bacteriostatic and antibacterial effect.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A block copolymer, comprising:

a first block comprising repeat units represented by formula (I):

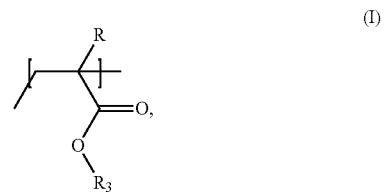

wherein R comprises hydrogen or methyl, and $R_3$ comprises C1-5 alkyl; and a second block connected to the first block, wherein the second block comprises repeat units represented by formula (II) or (III):

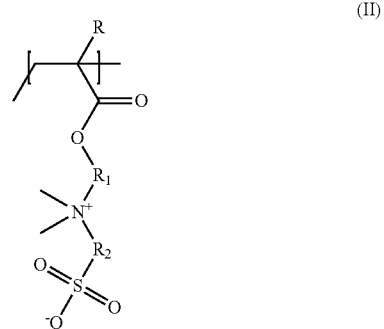

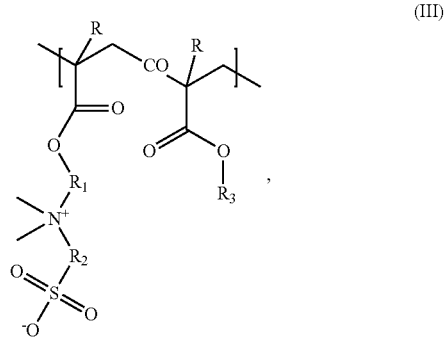

wherein R comprises hydrogen or methyl, $R_3$ comprises C1-5 alkyl, and $R_1$ and $R_2$, independently, comprise C1-8 alkyl, wherein one end of the second block is connected to the first block, and the other end of the second block is connected to

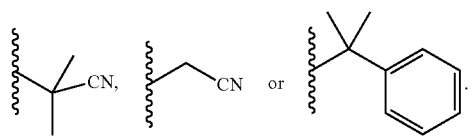

2. The block copolymer as claimed in claim 1, wherein the first block has a molecular weight of 3,000 to 60,000.

3. The block copolymer as claimed in claim 1, wherein the second block has a molecular weight of 5,000 to 60,000.

4. The block copolymer as claimed in claim 1, wherein one end of the first block is connected to the second block, and the other end of the first block is connected to

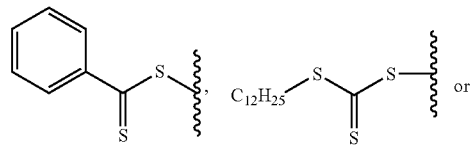

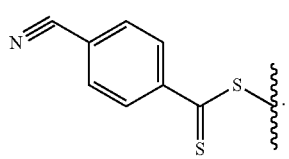

5. The block copolymer as claimed in claim 1, wherein the block copolymer is represented by formula (IV):

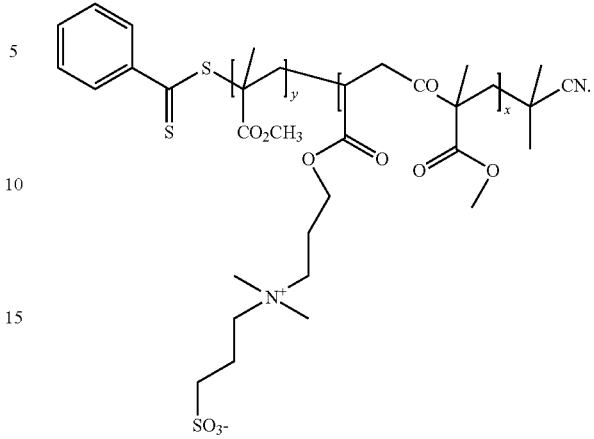

(IV)

6. The block copolymer as claimed in claim 5, wherein the block copolymer has a molecular weight of 8,000 to 100,000.

7. A thin film structure, comprising:
a polymer film having a surface; and
the block copolymer as claimed in claim 1, embedded in the polymer film.

8. The thin film structure as claimed in claim 7, wherein the polymer film comprises polyvinylidene fluoride (PVDF), polysulfone (PS), polyether sulfone (PES), polyvinyl chloride (PVC) or polyacrylonitrile (PAN).

9. The thin film structure as claimed in claim 7, wherein the second block has a coverage ratio, over the surface of the polymer film, of 20% to 60%.

* * * * *